April 12, 1927. 1,624,135
C. E. FOSTER
ELECTRICAL MEASURING INSTRUMENT
Filed April 16, 1925

Inventor:-
Charles E. Foster,
By: William A. Smith, Jr.
Attorney.

Patented Apr. 12, 1927.

1,624,135

UNITED STATES PATENT OFFICE.

CHARLES EDWIN FOSTER, OF LETCHWORTH, ENGLAND.

ELECTRICAL MEASURING INSTRUMENT.

Application filed April 16, 1925, Serial No. 23,631, and in Great Britain January 16, 1925.

This invention relates to the needle or pointer supporting devices such as used in indicating and recording instruments of the kind having an angularly moving pointer or needle, and has for its object to provide a readily detachable and accurately replaceable supporting device for the angularly movable pointer or needle.

The present invention consists of a support for an angularly movable pointer or needle of an indicating or recording instrument, comprising a fitting consisting of two pieces one a bracket piece having a fixing flange or the like for securing it to the instrument and the other the pointer or needle-supporting member, one of these members having a longitudinal projection adapted to be held in position in a longitudinal positioning groove in the other.

The relative positions of the pointer supporting member and the bracket member along the slot and groove may be limited by a stop or stops provided on each or either of the members.

Figures 1, 3:
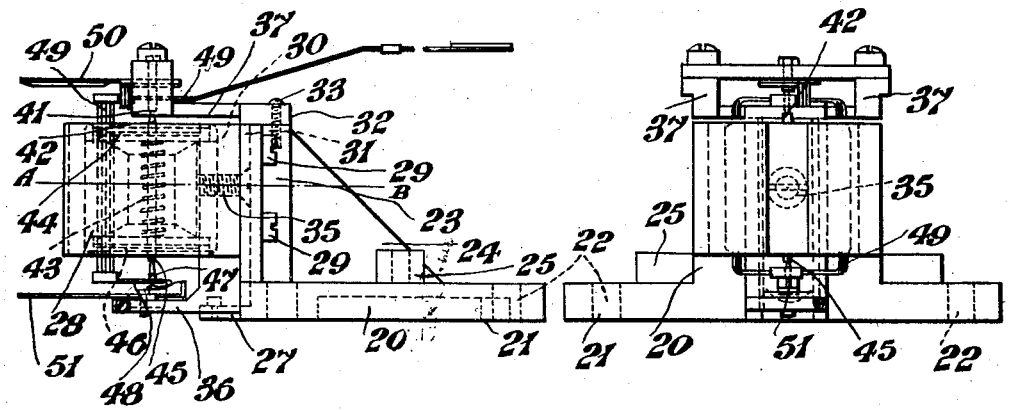
Figure 2:
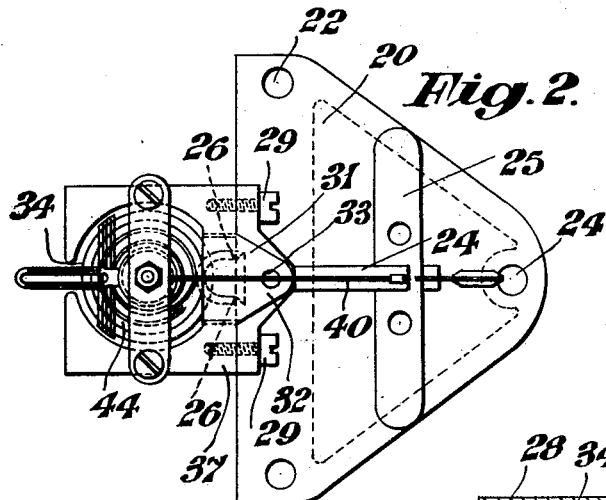
Figure 4:
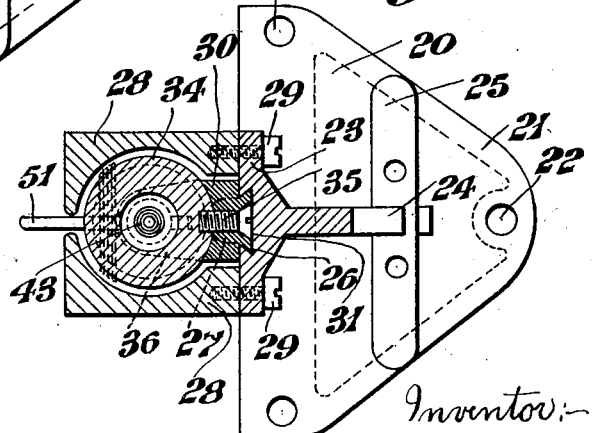

An embodiment of the invention is illustrated by the accompanying drawings wherein Fig. 1 is a side elevation, Fig. 2 a plan, and Fig. 3 a front elevation of a supporting device for the needle-carrier of an instrument of the moving coil type, while Fig. 4 is a sectional elevation through A—B Fig. 1.

In these drawings the pieces 20 and 30 are the two pieces of the support for the angularly movable member of an indicating or recording instrument, 20 being the bracket piece and 30 the pointer or needle supporting member.

The bracket member 20 is provided with a fixing flange 21 having holes 22 whereby it can be secured to the instrument by screws. This bracket member is provided with an upright piece 23 at right angles to the fixing flange and also with stiffening webs 24 and 25.

In the face of the upright piece 23 is provided a longitudinal dovetail groove 26 into which fits a corresponding dovetail projection 31 provided on the pointer or needle-carrying member 30.

At the end of the dovetail groove 26 is provided a stop 27 which limits the downward movement of the member 30, and at the upper portion of the member 30 is provided a projection or stop 32 by which it is held in position in the groove 26 by a screw 33.

The supporting device in the example illustrated is for use with a moving coil instrument of the kind having pole pieces 28, 28 secured to the upright 23 by screws 29, the instrument also having a hollow cylindrical core piece 34 secured by a screw 35 to the upright member 30. The movable coil and pointer system comprises a pointer 40 carrying a pivot 41 bearing in a cup 42 secured on the upper end of a shaft 43 and to a supporting spring 44 fitting in a recess at the upper end of the core 34. In a similar manner the lower end of the shaft 43 carries a bearing cup 45 secured to a spring 46 fitting in a recess in the lower end of the core 34. The cup 45 bears on a pivot 47 fixed in the arm 48 which carries the lower end of a moving coil 49, the upper end of the coil 49 being carried by the rear end of the pointer 40. The current to be measured is led into the coil 49 in any suitable manner through insulated terminals 50 and 51.

The upright member 30 is provided at its lower end with a laterally extending portion 36 which carries the terminal 51, and is provided at its upper end with a laterally extending portion 37 which carries the terminal 50.

In the construction shown the upright member 30 carrying the pointer system and the core piece 34 can be moved from the bracket member 20 by sliding its dovetail projection 31 along the groove 26 in the bracket 20 after removing the screw 33, and can be as readily replaced.

Both pieces of the supporting device, that is the bracket piece and the pointer-supporting member may be made as die-castings with the longitudinal projection and groove of the exact size and shape required for fitting together.

What I claim and desire to secure by Letters Patent is:—

1. In an indicating or recording instrument, a one-side support for the angularly movable pointer or needle comprising in combination a base member, a vertical member carried by said base member, a member arranged adjacent the pointer on one side thereof for supporting said pointer, and means for slidably mounting said supporting member upon said vertical member.

2. In an indicating or recording instrument in combination, a base member having means for fixing it to the instrument, an upright carried by said base member, an undercut groove in said upright, a member arranged adjacent the pointer on one side for supporting the pointer of the instrument, a projection carried by said supporting member adapted to fit and slide in said undercut groove of the upright, a stop for limiting the downward movement of said supporting member, and a projection for holding said supporting member in said groove.

3. In an indicating or recording instrument of the moving coil type, in combination, a bracket member, a base member, means for fixing said base member to the instrument, a one sided pointer supporting member carrying said pointer at one side, a post carried by said base member, a cylindrical core carried by said pointer supporting member mounted coaxially with the pointer, and a longitudinal projection and positioning groove for holding said core coaxially between the oppositely disposed grooves in a pair of pole pieces fixed to the bracket member.

4. In an indicating or recording instrument, a support for the movable pointer or needle comprising, in combination, a base member provided with means for fixing it to the instrument, a vertical member carried by said base member, a longitudinal undercut groove in said vertical member, a pointer supporting member arranged adjacent to and at one side of the pointer, a longitudinal projection upon said pointer supporting member adapted to fit and coact with said undercut groove, a stop carried by the vertical member for limiting the downward movement of said pointer supporting member, a projection upon said supporting member for holding it in position in the groove of the vertical member, and means for strengthening the base and vertical members.

In witness whereof I affix my signature.

CHARLES EDWIN FOSTER.